June 13, 1933.     N. A. SWARTZ ET AL     1,914,308
LIFTING DEVICE FOR TRUCKS AND VEHICLES
Filed July 15, 1931     2 Sheets-Sheet 1
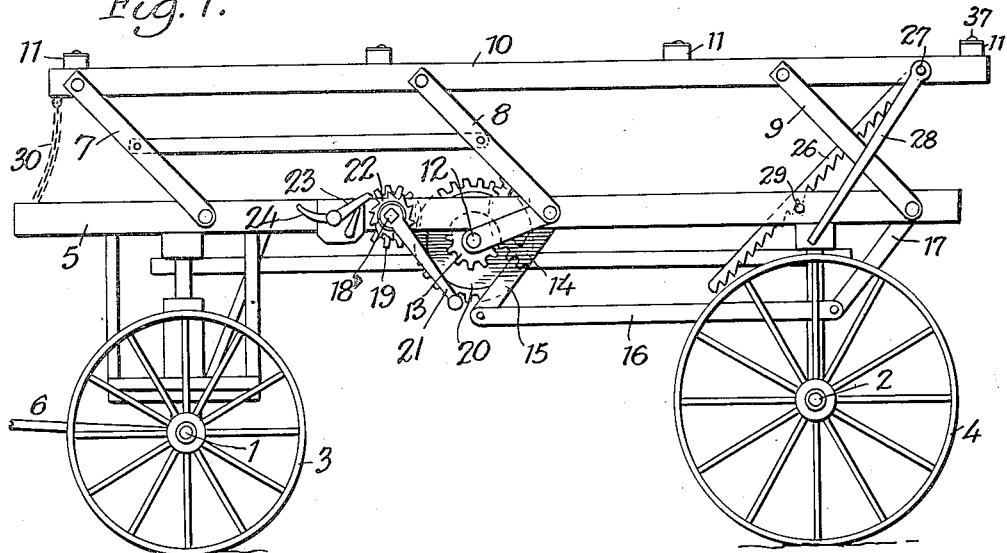
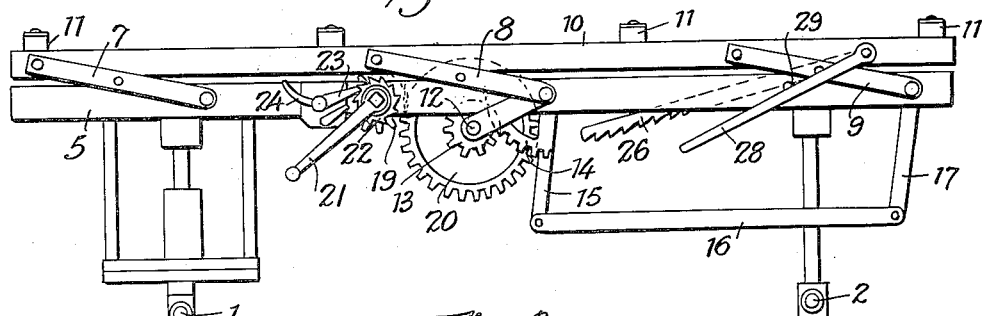
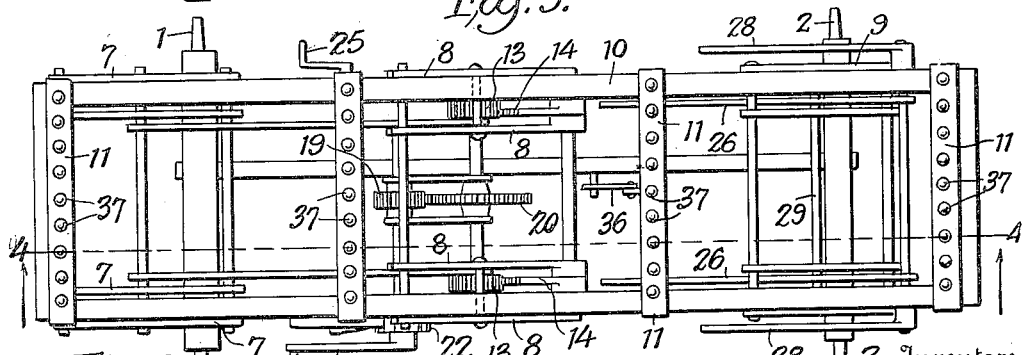

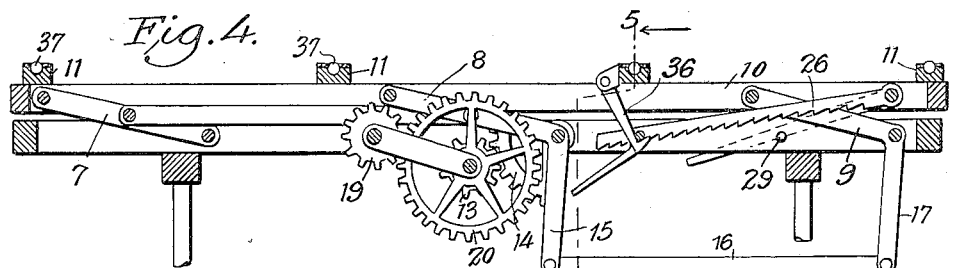
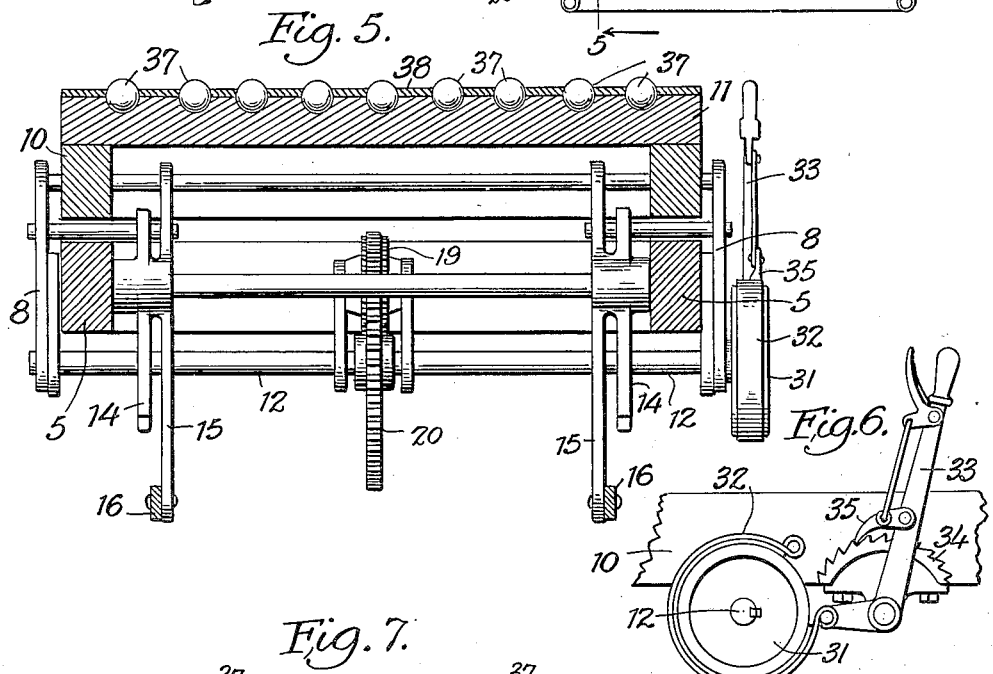
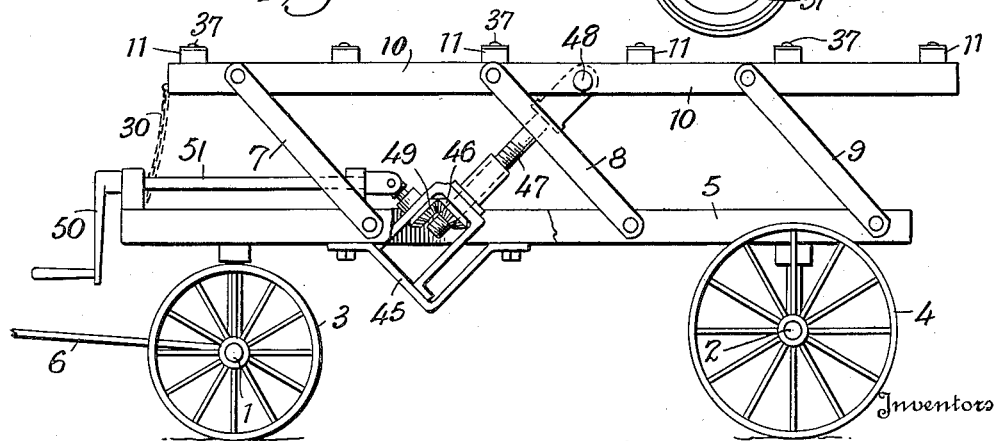
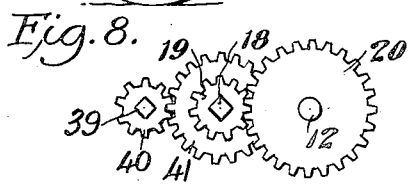

Patented June 13, 1933

1,914,308

UNITED STATES PATENT OFFICE

NOAH A. SWARTZ AND JOHN W. LEWIS, OF PUEBLO, COLORADO

LIFTING DEVICE FOR TRUCKS AND VEHICLES

Application filed July 15, 1931. Serial No. 551,024.

Our invention relates to lifting devices for trucks, and particularly to structure of this character intended and adapted to be embodied with baggage and express wagons as used in railway terminals and in other like connections where it is desired to provide for ready and easy elevation of articles and materials carried by a truck or wagon.

An object of this invention is to provide a lifting device for trucks so constructed and arranged that boxes, caskets, cases, safes, crates, and other articles and materials not readily handled and lifted by manual labor can be readily lifted to be moved into or from a car or other structure or platform at an elevation different from the normal elevation of the top of the truck.

Another object is to so construct and arrange the parts that heavy loads can be lifted and handled with the same facility as lighter loads and that when the load is lighter the operation can be quickened, thus adapting the device for ready and expeditious handling of anything that has to be loaded into and unloaded from express, baggage, mail, freight, or other cars or vehicles.

Still another object is to provide a structure of this character which has the parts thereof so constructed, arranged and mounted that most efficient operation is accomplished, and that the mechanism is at all times under complete and perfect manual control to thus maintain the highest efficiency in use and obviate or minimize the possibility of accidents.

With the above and other objects in view, which will be apparent to those skilled in the art, our invention includes certain novel features of construction and combinations of parts which will be hereinafter set forth in connection with the drawings.

In the drawings:

Figure 1 is a view in side elevation showing a truck fitted with a lifting device constructed in accordance with our invention and with the lifting structure partly elevated.

Fig. 2 is a view similar to Fig. 1 with the lifting structure lowered.

Fig. 3 is a top plan view of the parts as illustrated in Fig. 2.

Fig. 4 is a longitudinal vertical sectional view on substantially line 4—4 of Fig. 3.

Fig. 5 is a transverse vertical sectional view through the structure on line 5—5 of Fig. 4.

Fig. 6 is a fragmentary detailed view to better show a control brake.

Fig. 7 is a view similar to Fig. 1 illustrating a modified construction.

Fig. 8 is a fragmentary detailed view showing a modification of the operating means.

Fig. 9 is a fragmentary detailed view illustrating modified means for retaining the elevated position of the parts of the lifting device.

The truck structure as illustrated in the present instance is of the type of baggage and express wagons as now ordinarily used in railway terminals and other connections, and the axles 1 and 2 having wheels 3 and 4 thereon carry the supporting frame structure 5. To all intents and purposes this structure can be of the ordinary and usual construction and a handle 6 can be provided to move the truck or wagon, the same might be motor-driven, or the truck can be propelled in any other desired manner.

A plurality of elevating links 7, 8, and 9 are each pivoted at one end at spaced upper points upon the supporting frame structure 5, and at their free ends are pivotally connected with the side bars of a rectangular lifting frame 10, which frame can be made to correspond substantially in its size and shape to the usual size and shape of the supporting frame structure 5 of a truck or wagon. The side bars of the lifting device frame structure 10 have a plurality of supporting bars 11 secured transversely thereacross and adapted to receive the box, casket, case, safe, crate or other article to be lifted, or a platform carrying a plurality of articles or carrying material in more or less loose form.

The elevating links 7, 8 and 9 are so mounted that as they are swung from positions adjacent the supporting frame structure 5 the lifting frame 10 will be raised and will be moved endwise with respect to the supporting frame structure 5, and this latter movement is particularly advantageous as the truck or wagon can be moved to a point adjacent the door of a car or adjacent to any other floor or platform on to or from which articles are to be loaded, and as the lifting platform 10 is raised it will be moved endwise to close any spaces between the wagon structure and the edge of the floor or platform to thus present the lifting frame 10 to be substantially a continuation of the floor or platform.

In the main embodiment we have shown a shaft 12 extending across the supporting frame structure 5 in proximity to the pivoted end of one of the elevating links, and a pinion 13 on the shaft is in engagement with a segmental rack 14 associated with the adjacent elevating link. In the present instance we have shown this segmental rack 14 associated with the elevating link 8, and a lifting lever 15 swung by this segmental rack 14 below the supporting frame structure 5 is connected by a link 16 with an elevating lever 17 which is connected to swing elevating link 9. With this construction and arrangement, as shaft 12 is rotated, pinion 13 working in mesh with segmental rack 14 will cause elevating links 8 and 9 to be swung upwardly or downwardly and in consequence the lifting frame structure 10 will be elevated or lowered. In order to facilitate operation and lessen the strain of manipulating the lifting device, we provide a shaft 18 extending parallel with and slightly spaced from shaft 12. A pinion 19 on this shaft 18 is in mesh with a large gear 20 on shaft 12, and as shaft 18 is revolved the power is increased through the gearing to shaft 12. This shaft 18 has both ends extending at opposite sides of the supporting frame structure 5, and made of polygonal form to interchangeably receive the crank-handle 21, so that shaft 18 can be rotated from either side of the truck.

With this construction and arrangement of the parts, as the crank-handle 21 is manipulated shaft 12 is rotated, and pinion 13 thereon meshing with segmental rack 14 causes lifting lever 15 and elevating lever 17 to be swung so that the lifting platform or frame 10 is raised or lowered. A ratchet 22 on shaft 18 has pawl 23 pivotally mounted on the supporting frame structure 5 in position to engage with the teeth thereof, and hand levers 24 and 25 are provided on opposite sides of the supporting frame 5 to permit manipulation of pawl 23 by the operator when the crank-handle 21 is fitted on either end of shaft 18. In this way the back movement of the shaft 18 and the parts controlled thereby is prevented except as the operator may desire.

If desired, provision might be made to dispense with the crank handle 21 and operate the parts by power, such as electric motor, hydraulic power, compressed air or engine power and in fact any power means; and, as such adaptations are well known they are not here illustrated.

As an additional protection against lowering of the lifting platform or frame 10, we provide toothed bars 26 at one end of the lifting platform mounted on shaft 27 which is pivoted between the side members of frame 10, hand levers 28 being provided on each side of the truck and frame for manipulating the shaft 27 to swing the toothed bars 26. A rod 29 secured across between the side members of supporting frame structure 5 is positioned so that as the toothed bars 26 swing down by gravity, the toothed edges thereof will be against rod 29. With this arrangement, as the lifting platform or frame 10 is raised the toothed bars 26 will have their teeth engaged on rod 29 to prevent back movement or lowering of the lifting platform or frame. If desired, a chain or other element 30 can be provided to limit upward lifting movement of the platform or frame 10.

Where the lifting device is to be used in handling heavy loads which would tax the strength of the operator manipulating the crank-handle 21, it may be advisable to provide brake means to control the speed of movement of shaft 12, and one such means is illustrated in Fig. 6. As here shown, the brake drum 31 is secured on shaft 12 and a brake band 32 fitted around this brake drum is tightened by manipulation of brake lever 33. A toothed rack 34 and pawl 35, or other suitable means, can be provided to permit and hold adjusted settings of the brake lever 33. If desired, the brake mechanism might be of any other approved form and may be mounted in conjunction with shaft 18 or associated in any other manner with the mechanism.

In some instances it may not be found desirable to use the toothed bars 26, and we therefore provide a retaining hook or latch 36 which can be used to hold the toothed bars in a raised and inoperative position, as best shown in Fig. 4.

While the cross bars 11 will serve to receive and support the load, it may be found desirable to provide rollers or other friction reducing means to allow more rapid movement of an article or platform carried by the cross bars, and in the present instance we have shown an arrangement of friction reducing balls that might be used to advantage in this connection. As the parts are best shown in Fig. 5 the bars 11 are recessed to receive the balls 37, and a retaining plate 38 having openings therethrough serves as a cage to retain the balls in place and yet leaves the upper sides exposed to receive and support a case, platform or other load to be supported by the lifting platform or frame 10. If desired, a top or floor made of wood or any other suitable material may be mounted upon the cross bars 11 to serve as a platform or floor to receive the article or material to be lifted, and in such a construction the friction reducing means would be dispensed with. Also, it will be appreciated that this friction reducing means could be eliminated and the article or load can be placed directly upon the cross bars 11.

As shown in Fig. 8, the additional shaft 39 might be provided with a pinion 40 thereon meshing with a gear 41 on shaft 18, and this additional gearing will increase the leverage to reduce the working load in operating the lift mechanism. Shafts 39 and 18 can be made of polygonal form on each end, and with this arrangement it is possible to manipulate the operating structure from either side of the truck and by manual rotation of either shaft 39 for heavy loads or shaft 18 for lighter loads and quicker results.

As illustrated in Fig. 9, the toothed bars 26 might be dispensed with and toothed track bars 42 can be provided on the top edges of the side bars of supporting frame 5, with pawl members 43 pivoted upon the lifting platform or frame 10 dropping by gravity to engage with the teeth of the toothed bars 42. Hand levers 44 can be provided for moving the pawls 43 to the inoperative position and any suitable form of latch means might be provided to retain the pawls in inoperative position.

As the parts are disclosed in Fig. 7, a modified construction and arrangement of lifting mechanism is disclosed. In this modified form the lifting platform 10 is mounted upon the supporting frame structure 5 by means of links 7, 8 and 9, in the same manner as heretofore set forth. An angularly disposed bracket frame 45 carried by the supporting frame structure 5 has a miter gear 46 swivelled therein and provided with an internal threaded axial bore to receive lifting screw 47. This lifting screw 47 is movably connected at 48 with the lifting platform or frame 10. A miter gear 49 is in mesh with miter gear 46 and is rotated by handle 50 connected with shaft 51 having universal connection with the shaft of this gear 49. With this construction rotation of shaft 51 by handle 50 will cause the platform or frame 10 to be raised and lowered and as back movement or drive will not occur from screw 47 to miter gear 46 it is not necessary to have ratchet, brake, or other mechanism. This same adaptation might be worked out with hydraulic or similar jack or lifting means substituted for the miter gear 46 and screw 47.

While we have herein shown and described only certain specific embodiments of our invention and have suggested only certain possible modifications, it will be appreciated that changes and variations can be made in the form, construction, arrangement and assembly of the parts without departing from the spirit and scope of our invention.

We claim:

1. A lifting device for trucks comprising, with a truck having a supporting frame, a lifting platform, swinging links mounting said lifting platform on said supporting frame for elevating and endwise shifting movement, a lifting lever swingably mounted on said supporting frame intermediate said links and connected with said lifting platform, a shaft journalled on said supporting frame beneath the platform, a pinion on said shaft, a segmental rack associated with said lifting lever and in mesh with said pinion, power increasing means to rotate said shaft to accomplish raising and lowering of said lifting platform, and means to control such raising and lowering movement.

2. A lifting device for trucks comprising, with a truck having a supporting frame, a lifting platform, swinging links mounting said lifting platform on said supporting frame for elevating and endwise shifting movement, a lifting lever swingably mounted on said supporting frame intermediate said links and connected with said lifting platform, a shaft journalled on said supporting frame beneath the platform, a pinion on said shaft, a segmental rack associated with said lifting lever and in mesh with said pinion, power increasing means to rotate said shaft to accomplish raising and lowering of said lifting platform, means to control such raising and lowering movement, and means to hold said lifting platform in elevated positions.

In testimony whereof we hereunto affix our signatures.

NOAH A. SWARTZ.
JOHN W. LEWIS.